(12) United States Patent
Husted

(10) Patent No.: US 6,499,783 B1
(45) Date of Patent: Dec. 31, 2002

(54) CONVERTIBLE FLATBED UTILITY STOCK TRAILER

(76) Inventor: Delores J. Husted, 2509 Moser Rd., Palestine, TX (US) 75803

( * ) Notice: Subject to any disclaimer, the term of this patent is extended or adjusted under 35 U.S.C. 154(b) by 0 days.

(21) Appl. No.: 09/973,541

(22) Filed: Oct. 9, 2001

(51) Int. Cl.[7] .............................. B60P 3/04; B60P 3/42; B62D 33/04
(52) U.S. Cl. ...................... 296/24.2; 296/12; 296/35.3; 296/36; 296/29; 296/197; 296/181; 119/405; 119/412
(58) Field of Search ................................ 296/181, 182, 296/183, 197, 24.2, 100.02, 35.3, 36, 10, 12; 119/412, 405

(56) References Cited

U.S. PATENT DOCUMENTS

| | | | | |
|---|---|---|---|---|
| 745,170 A | * | 11/1903 | Eppley | 119/415 |
| 836,890 A | * | 11/1906 | Phillips, Jr. | 119/415 |
| 3,091,493 A | * | 5/1963 | Rivers | 296/183 |
| 3,473,679 A | | 10/1969 | Weichel | |
| 3,940,179 A | * | 2/1976 | McBride | 296/43 |
| 4,072,337 A | * | 2/1978 | Barker | 296/27 |
| 4,089,555 A | * | 5/1978 | Allen | 296/182 |
| 4,092,044 A | | 5/1978 | Hoffman | |
| 4,250,836 A | | 2/1981 | Smith | |
| 4,290,640 A | * | 9/1981 | Dalton | 296/216 |
| 4,468,046 A | | 8/1984 | Rutherford | |
| 4,498,418 A | | 2/1985 | Chumley | |
| 4,533,171 A | * | 8/1985 | Lake | 296/173 |
| 4,579,382 A | * | 4/1986 | Lake | 296/181 |
| 4,587,907 A | * | 5/1986 | Haney | 105/378 |
| 4,592,689 A | * | 6/1986 | Leitzke | 411/358 |
| 5,056,859 A | * | 10/1991 | Walder | 296/180 |
| 5,154,480 A | * | 10/1992 | Jones | 296/181 |
| 5,480,180 A | * | 1/1996 | Fuller et al. | 280/656 |
| 5,715,641 A | | 2/1998 | Hall, Jr. | |
| 5,718,554 A | | 2/1998 | McElroy | |
| 5,769,478 A | * | 6/1998 | Vernese | 296/24.2 |
| 5,791,726 A | | 8/1998 | Kaufman | |
| 5,984,400 A | * | 11/1999 | Miller et al. | 296/100.15 |
| 6,135,693 A | * | 10/2000 | Leitzke et al. | 411/530 |
| 6,213,053 B1 | * | 4/2001 | Lammers | 119/51.01 |

FOREIGN PATENT DOCUMENTS

FR 2683195 * 5/1993 .................. 296/181

* cited by examiner

Primary Examiner—D. Glenn Dayoan
Assistant Examiner—H. Gutman
(74) Attorney, Agent, or Firm—Randal D. Homburg

(57) ABSTRACT

The invention is a utility trailer incorporating a flatbed trailer combined with a detachable stock trailer shell, a removable center divider and a removable fabric roof cover, allowing use of the trailer as an open flat bed, an open stock trailer with one or two stalls, or a covered stock trailer.

5 Claims, 3 Drawing Sheets

CONVERTIBLE FLATBED UTILITY STOCK TRAILER

CROSS REFERENCE TO RELATED APPLICATIONS

None

I. BACKGROUND OF THE INVENTION

1. Field of Invention

The invention is a utility trailer incorporating a flatbed trailer combined with a detachable stock trailer shell, a removable center divider and a removable fabric roof cover, allowing use of the trailer as an open flat bed, an open stock trailer with one or two stalls, or a covered stock trailer.

2. Description of Prior Art

The following United States patents were discovered and are disclosed within this application for utility patent. All relate to trailers, some even having conversion features. In U.S. Pat. No 3,473,679 to Weichel, a multi-purpose agricultural vehicle is disclosed having several variations on a basic trailer frame. However, none of the variations disclose a stock trailer conversion unit with a removable fabric roof segment, nor do they include a removable divider within the stock trailer unit. A portable stock corral is disclosed in U.S. Pat. No. 4,250,836 to Smith. A convertible livestock trailer and grain trailer is disclosed in U.S. Pat. No. 4,092,044 to Hoffman having a plurality of movable ramps with a second purpose of defining a grain hopper, the device including a removable tarp during use as a grain hauling trailer.

A convertible horse-drawn wagon convertible to a two wheeled towing trailer is disclosed in U.S. Pat. No. 4,468,046 to Rutherford. In U.S. Pat. No. 4,498,418 to Chumley, a cattle car which is also suited for grain transport especially suited for poor weather transport, the invention including a climate control system for maintaining a suitable environment within the invention. A truck trailer with a removable rack for loading and unloading livestock.

II. SUMMARY OF THE INVENTION

The primary objective of the present invention is to provide a singular trailer which may be used as a flatbed trailer or a stock trailer, the invention having a basic flat bed trailer with side rails and a floor, but also including a streamlined stock trailer shell which is attached to the floor of the flatbed trailer by a plurality of shell clip, attached to the stock trailer shell inserted and locked into an equal plurality of shell clip receivers embedded within the floor of the flatbed trailer. Additionally, the stock trailer shell contains a multiplicity of fastening devices which engage an equal multiplicity of fasteners affixed to a removable fabric cloth allowing for the covered and dry transport of the livestock in in climate weather conditions. At least two removable arched stays attach to the stock trailer shell to provide support to the removable fabric cloth when engaged upon the stock trailer shell.

The stock trailer shell includes a pair of hinged doors at the rear of the stock trailer shell and also includes a removable central divided panel to separate the stock trailer shell into separate compartments within the stock trailer shell for hauling more than one animal.

III. DESCRIPTION OF THE DRAWINGS

The following drawings are submitted with this utility patent application.

IV. DESCRIPTION OF THE PREFERRED EMBODIMENT

Figure 1:
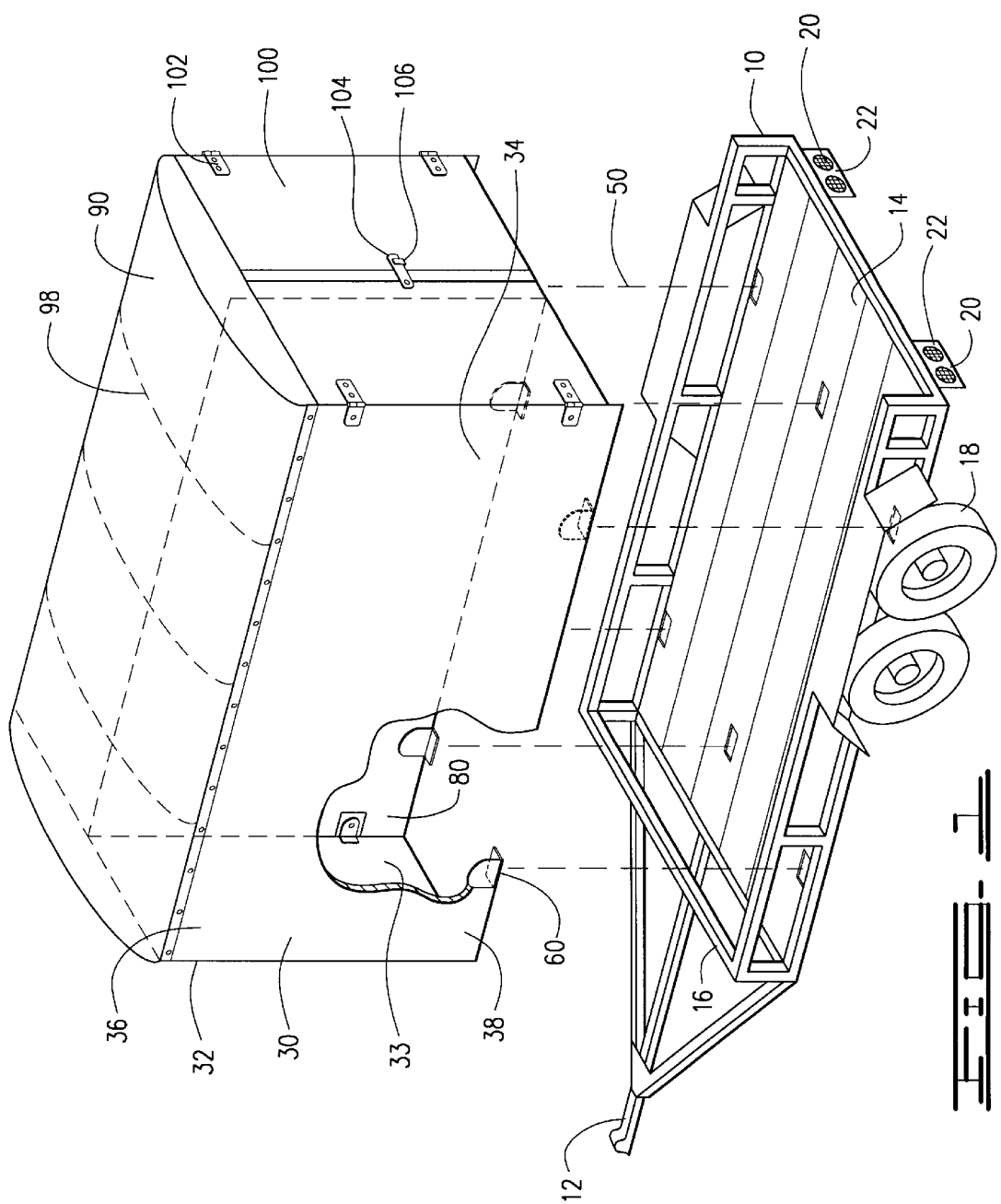
FIG. 1 is a perspective view of the invention.

The invention, as shown in FIGS. 1–4 of the drawings, is a convertible utility and stock trailer utilizing a base flatbed trailer with detachable components providing optional use as a stock trailer for the transport of livestock, the invention comprising a flatbed trailer 10 having a trailer hitch 12, a floor 14, a perimeter railing 16 and at least two two-wheeled axles 18, a stock trailer shell 30 having a contoured front portion 32, two side panel portions 34, an upper perimeter 36 and a bottom perimeter 38, a means 50 of attaching the bottom perimeter 38 of the stock trailer shell 30 to the floor 14 of the flatbed trailer 10, a removable center divider panel 80 attaching to the stock trailer shell 30 and to the floor 14 of the flatbed trailer 10 and a removable roof cover 90 attaching to the upper perimeter 36 of the stock trailer shell 30.

Figure 2:
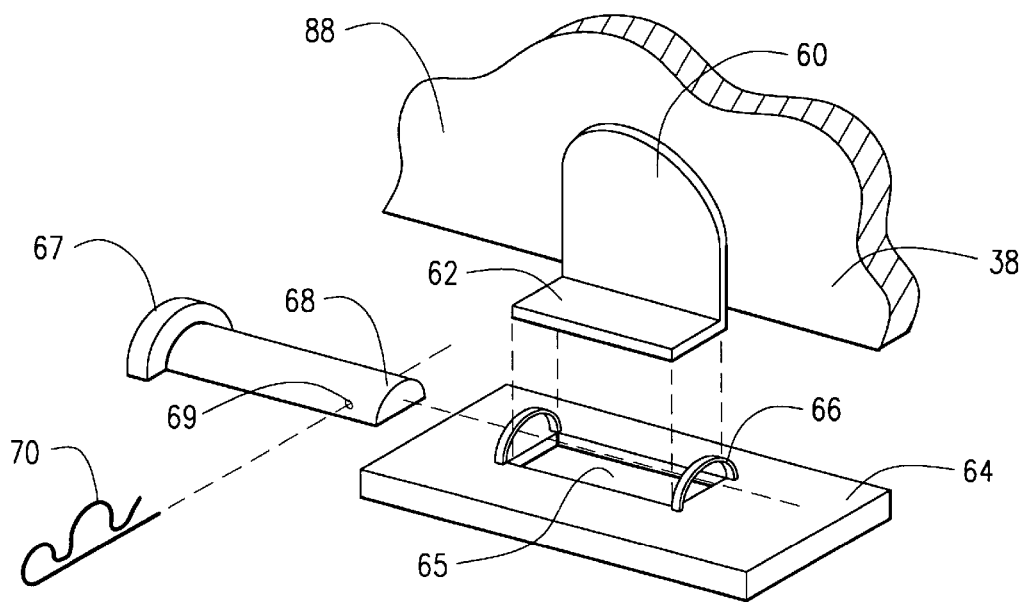
FIG. 2 is a view of the shell attachment means, including a shell clip, a clip pin and a wire cotter and the clip receiver in the floor of the flatbed trailer.

In a preferred embodiment, the flatbed trailer 10 includes brake lights 20 and tail lights 22 so that when the flatbed trailer 10 is operated with the stock trailer shell 30 attached, the flatbed trailer 10 meets with traffic regulations. In this preferred embodiment, as shown in FIGS. 1 and 2, the means 50 of attaching the bottom perimeter of the stock trailer shell to the floor of the flatbed trailer includes a plurality of shell clips 60 having an upward angled retaining tab 62, the shell clips 60 extending from the bottom perimeter 38 on the contoured front portion 32 and two side panel portions 34 of the stock trailer shell 30, an equal plurality of clip receivers 64 mounted within the floor 14 of the flatbed trailer 10, the shell clips 60 being received within a slot 65 provided in the clip receivers 64, the clip receivers also having two arched hoops 66, wherein a clip pin 67, having an insertion end 68 with a hole 69 to receive a wire cotter pin 70, is inserted and retained within the arched hoops 66 by at least one wire cotter pin 70, the placement of the clip pin 67 in the arched hoops 66 locking the upward angled retaining tabs 62 of the shell clips 60 within the slots 65 of the clip receivers 64. Thus attaching the stock trailer shell 30 to the flatbed trailer 10 involves lowering the stock trailer shell 30 onto the floor 14 of the flatbed trailer 10, aligning the shell clips 60 with the clip receivers 64, inserting the upward angled retaining tabs 62 within the slots 65 of the clip receivers 64, applying the clip pins 67 through the pair of arched hoops 66 on each clip receiver 64, and locking the clip pin 67 within the arched hoops 66 using a wire cotter pin 70. The invention, in this assembly, may be used as an open stock trailer for short distance livestock hauling and transport.

Figure 3:
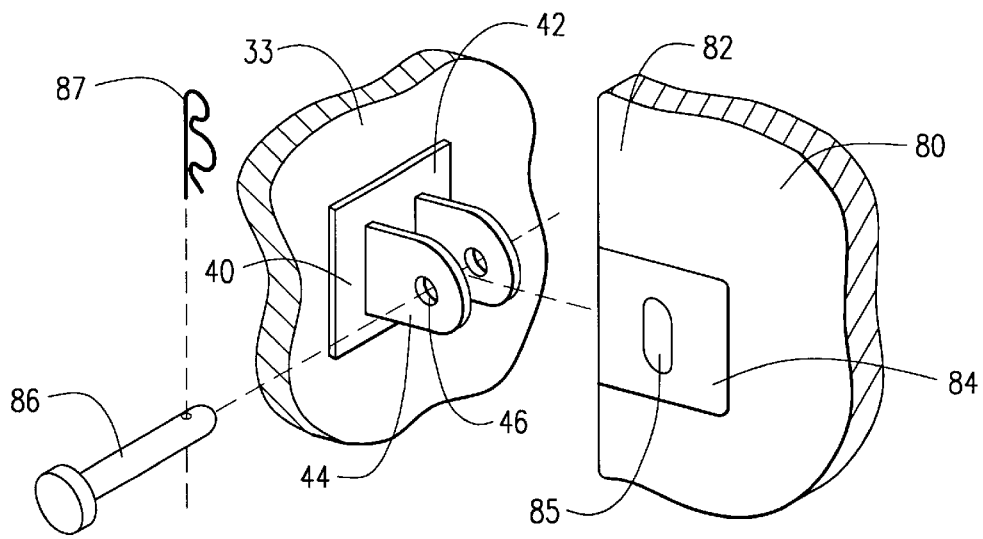
FIG. 3 is a view of the shell anchor bracket in the interior wall of the contoured front panel, and the removable center divider, including the reinforced divider slot, a connector pin and a wire cotter.

The invention may be used as a split compartment stock trailer by application of the removable center divider panel 80 to the stock trailer shell 30 and flatbed trailer 10 assembly. The contoured front portion 32 of the stock trailer shell 30 has an interior wall 33 onto which is attached at least one shell anchor bracket 40, as shown in FIG. 3 of the drawings.

This shell anchor bracket 40 has a base plate 42 and two outward extending flanges 44, each outward extending flange 44 having a pin hole 46. The removable center divider panel 80 has a vertical edge 82 including at least one reinforced divider slot 84 having a pin hole 85. The pin hole 85 of the reenforced divider slot 84 is aligned with the pin holes 46 of the outward extending flanges 44, at which time a connector pin 86 is inserted through the pin holes 46 of the aligned flanges 44 and the pin hole 85 of the reenforced divider slot 84. The connector pin 86 may be retained by use of a wire cotter pin 87. In addition, the removable center divider panel 80 has a bottom portion 88 from which extends at least one shell clip 60, identical to the shell clips 60 on the stock trailer shell 30, having the same upward angled retaining tab 62, which is received within another clip receiver 64 in the floor 14 of the flatbed trailer 10, retained by the same clip pin 67 and wire cotter pin 70.

Figure 4:
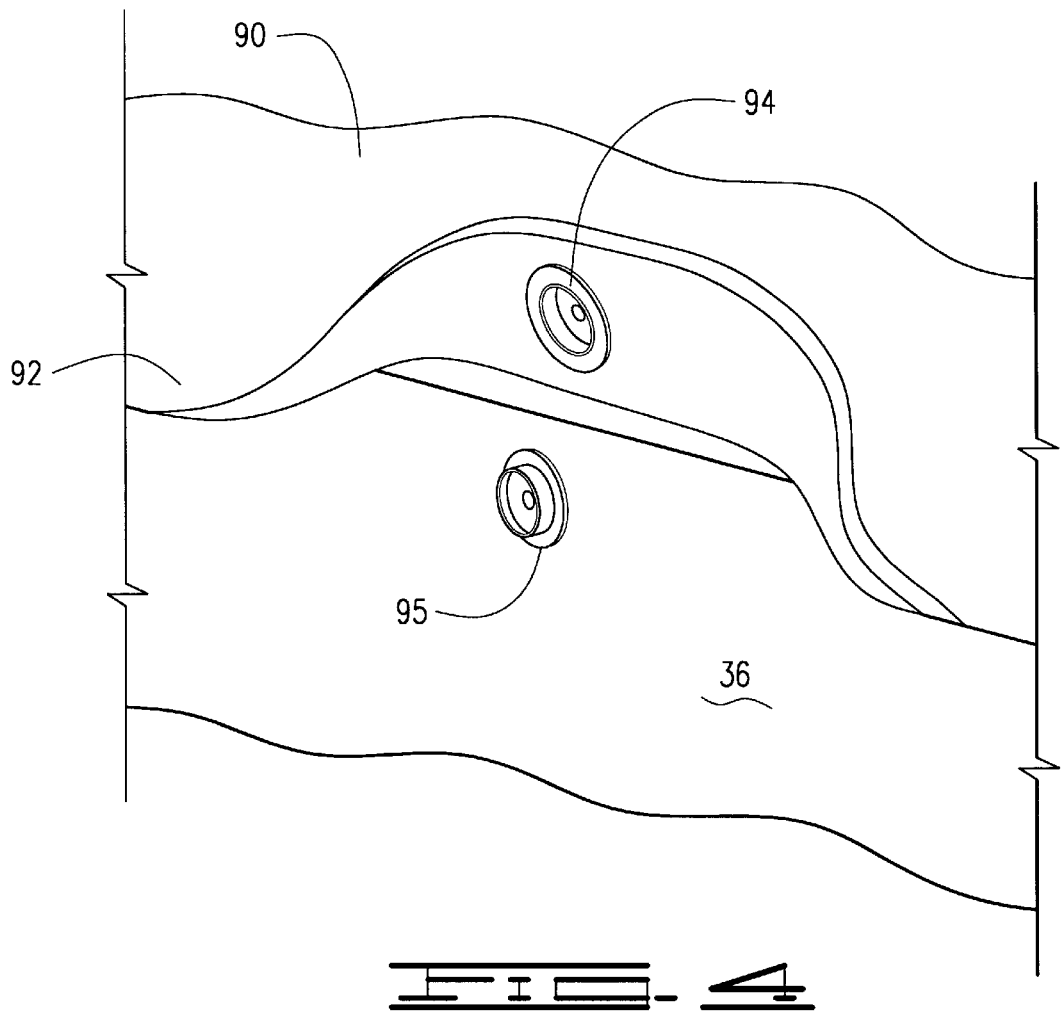
FIG. 4 is a view of a removable roof cover, including a snap collar affixed to the removable cover and a snap base attached to the upper perimeter of the stock trailer shell.

Along the upper perimeter 36 of the stock trailer shell 30 are a multiplicity of equally spaced snap base members 95. The removable roof cover 90 is preferably a weather resisting fabric having an outer perimeter 92, to which is applied a multiplicity of equally spaced snap collar members 94. These snap collar members 94 engage the snap base members 95 which provide the attachment of the removable roof cover 90 to the upper perimeter 36 of the stock trailer shell 30, as shown in FIGS. 1 and 4 of the drawings. This removable roof cover 90 is used when transport of livestock may be conducted in poor weather conditions to protect the transport livestock from full exposure to the elements. Arched removable staves 98 may be mounted between the side panel portions 34 of the stock trailer shell 30 to support the removable roof cover 90, as shown in FIG. 1 of the drawings.

As indicated in FIG. 1 of the drawings, the stock trailer shell 30 may also include a hinged door 100 attached to the side panel portions 34 of the stock trailer shell 30. This hinged door 100 may be a single door, or it may include a pair of doors, as shown in FIG. 1, including attaching hinges 102 and a retractable handle 104 and handle clip 106.

While the invention has been particularly shown and described with reference to a preferred embodiment thereof, it will be understood by those skilled in the art that changes in form and detail may be made therein without departing from the spirit and scope of the invention.

What is claimed is:

1. A convertible utility and stock trailer utilizing a base flatbed trailer with detachable components for the transport of livestock, the invention comprising:
    a. the flatbed trailer having a trailer hitch, a floor, a perimeter railing and at least two two-wheeled axles;
    b. a stock trailer shell having a contoured front portion, two side panel portions, an upper perimeter and a bottom perimeter;
    c. a removable center divider panel attached to the stock trailer and to the floor of the flatbed trailer;
    d. a removable fabric roof cover attached to the upper perimeter of the stock trailer shell; and
    e. a means of attaching the bottom perimeter of the stock trailer shell to the floor of the flatbed trailer, said means further comprising
        a plurality of shell clips having an upward angled retaining tab, the shell clips extending from the bottom perimeter on the contoured front portion and two side panel portions of the stock trailer shell;
        a corresponding plurality of clip receivers mounted within the floor of the flatbed trailer, the shell clips being received within a slot provided in the clip receivers, the clip receivers also having two arched hoops; and
        a plurality of clip pins, having an insertion end with a hole to receive one of a plurality of wire cotter pins, inserted and retained within the arched hoops by the wire cotter pin, the placement of the clip pin in the arched hoops locking the upward angled retaining tabs of the shell clips within the slots of the clip receivers.

2. The convertible utility and stock trailer as disclosed in claim 1, further providing the attachment of the center divider panel, wherein:
    a. the contoured front portion of the stock trailer shell has an interior wall onto which is attached at least one shell anchor bracket having a base plate and two outward extending flanges, each said flange having a pin hole;
    b. the center divider panel having at least one reinforced divider slot having a pin hole, the pin hole of the reenforced divider slot is aligned with the pin holes of the outward extending flanges;
    c. a connector pin is inserted through the pin holes of the aligned flanges and the pin hole of the reenforced divider slot, retained by use of a wire cotter pin; and
    d. the center divider panel also having a bottom portion from which extends at least one shell clip having an upward angled retaining tab, which is received within a slot within a clip receiver in the floor of the flatbed trailer, retained by a clip pin having an insertion end with a hole also receiving a wire cotter pin, locking the upward extending retaining tab within the slot of the clip receiver.

3. The convertible utility and stock trailer as disclosed in claim 1, further comprising:
    a. the upper perimeter of the stock trailer shell includes a multiplicity of snap base members equally spaced around said upper perimeter;
    b. the removable fabric roof cover having an outer perimeter, to which is applied a multiplicity of snap collar members, equally spaced apart, said snap collar members engaging the snap base members, attaching the removable fabric roof cover to the upper perimeter of the stock trailer shell; and
    c. arched removable staves mounted between the side panel portions of the stock trailer shell supporting the removable fabric roof cover.

4. A convertible utility and stock trailer utilizing a base flatbed trailer with detachable components for the transport of livestock, the invention comprising:
    a. the flatbed trailer having a trailer hitch, a floor, a perimeter railing and at least two two-wheeled axles;
    b. a stock trailer shell having a contoured front portion, two side panel portions, an upper perimeter and a bottom perimeter;
    c. a means of attaching the bottom perimeter of the stock trailer shell to the floor of the flatbed trailer, said means attached to:
        i) a plurality of shell clips having a plurality of upward angled retaining tab, the shell clips extending from the bottom perimeter on the contoured front portion and two side panel portions of the stock trailer shell;
        ii) a corresponding plurality of clip receivers mounted within the floor of the flatbed trailer, the shell clips being received within a slot provided in the clip receivers, the clip receivers also having two arched hoops; and iii) a plurality of clip pins, having an insertion end with a hole to receive one of a plurality of wire cotter pins, inserted and retained within the arched hoops by the wire cotter pin, the placement of the clip pin in the arched hoops locking the upward angled retaining tabs of the shell clips within the slots of the clip receivers;

d. a removable center divider panel attached to the stock trailer and to the floor of the flatbed trailer,
   i) the contoured front portion of the stock trailer shell having an interior wall onto which is attached at least one shell anchor bracket having a base plate and two outward extending flanges, each said flange having a pin hole;
   ii) the center divider panel having at least one reenforced divider slot having a pin hole, the pin hole of the reenforced divider slot is aligned with the pin holes of the outward extending flanges;
   iii) a connector pin inserted through the pin holes of the aligned flanges and the pin hole of the reenforced divider slot, retained by use of a wire cotter pin; and
   iv) the center divider panel also having a bottom portion from which extends at least one shell clip, identical to the shell clips on the stock trailer shell, having the upward angled retaining tab as does the stock trailer shell, which is received within the clip receiver in the floor of the flatbed trailer, retained by the clip pin and wire cotter pin; and e. a removable fabric roof cover, having an outer perimeter, attached to the upper perimeter of the stock trailer shell by
   i) a multiplicity of snap base members equally spaced around the upper perimeter;
   ii) a multiplicity of snap collar members applied to the outer perimeter of the removable fabric roof cover, equally spaced apart, said snap collar members engaging the snap base members, attaching the removable fabric roof cover to the upper perimeter of the stock trailer shell; and
   iii) arched removable staves mounted between the side panel portions of the stock trailer shell supporting the removable fabric roof cover.

5. The convertible utility and stock trailer as disclosed in claim 4, wherein the stock trailer shell including a hinged door attached to the side panel portions of the stock trailer shell including attaching hinges, a retractable handle and handle clip.

* * * * *